June 12, 1928.   K. O. NILSSON   1,673,700
SELF OILING BEARING
Filed May 16, 1927    2 Sheets-Sheet 1

Inventor
K. O. Nilsson
by
Wilkinson & Ginsta
Attorneys.

June 12, 1928.  
K. O. NILSSON  
1,673,700  
SELF OILING BEARING  
Filed May 16, 1927    2 Sheets-Sheet 2
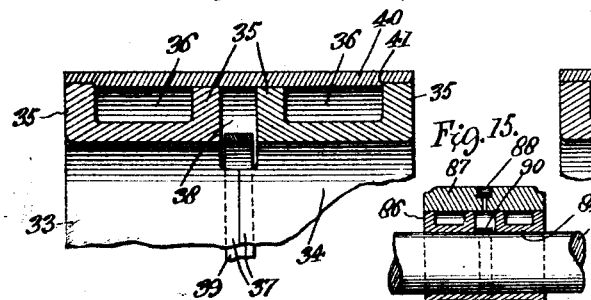
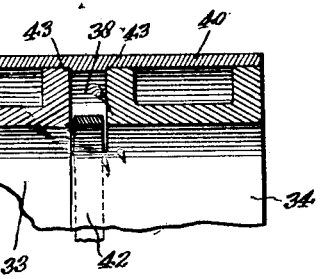
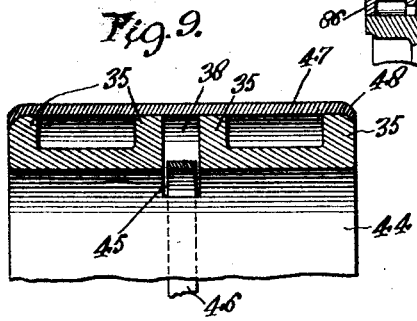
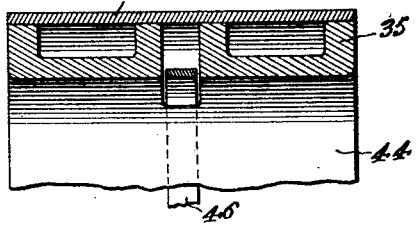
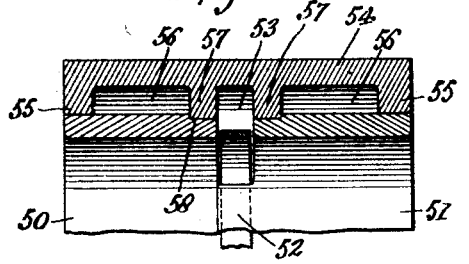
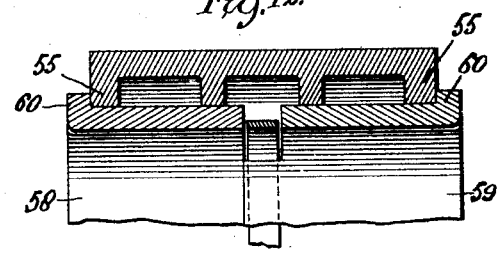
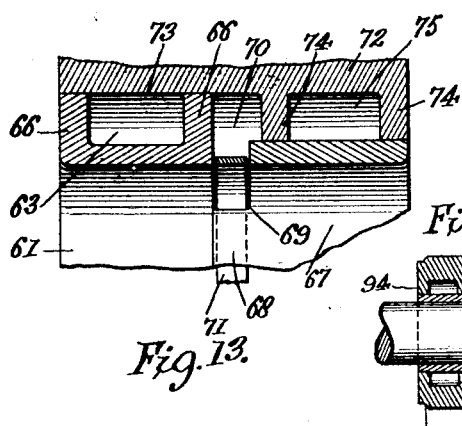

Patented June 12, 1928.

1,673,700

UNITED STATES PATENT OFFICE.

KARIN O. NILSSON, OF ALTON, ILLINOIS.

SELF-OILING BEARING.

Application filed May 16, 1927. Serial No. 191,872.

The present invention relates to bearings and more particularly to that type known as self-oiling or lubricating and wherein the operation of the bearing spreads or distributes the oil over the bearing surfaces.

An object of the present invention is to provide a self-lubricating bearing of this type which is of such construction that it may be used in practically all instances where bushings or the like are employed, the bearing of this invention being capable of use wherever a socket or hole may be bored and a bushing fitted therein.

Another object of the invention is to provide a self-lubricating bearing wherein the bore or opening may be concentric with the shaft and bearing surfaces, and wherein the bearing may be used either as a stationary or a rotating member.

A further object of the invention is to provide a structure of self lubricating bearing which adapts itself to various modifications in the bushing and shell parts for accommodating the bearing to different uses and in different positions to adapt the bearing to practically universal use.

The invention also aims to provide a structure which embodies a feed or elevating ring having inner and outer contact faces adapted to bear against the rotary parts for operating the ring and wherein wear between the ring and the parts is taken up by both the interior and exterior surfaces of the ring and the latter is more positively driven as the wear takes place.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a longitudinal vertical section taken through a self-lubricating bearing constructed according to this invention;

Figure 7 is a fragmentary vertical section through the upper part of another modified form of the bearing, showing the bushing in separate parts secured together by the shell;

Figure 8 is another modification of the bushing and shell structure;

Figure 9 is a further modification showing a one-piece bushing with the shell swaged at its ends upon the bushing;

Figure 10 is a like view with the shell threaded to the bushing;

Figure 11 is a view similar to Figure 8 but with the partition ribs carried by the shell instead of by the bushing;

Figure 12 is a like view with the ends of the bushing flanged to hold the shell thereon;

Figure 13 is another fragmentary view of the bearing with the partitions carried by the bushing and the shell and overlapping one another; and Figure 14 is a like view of a still further modification of the bearing wherein the partitions are carried partly by the bushing and partly by the shell;

Figure 15 is a longitudinal section taken through another modified form of the invention; and Figure 16 is a similar view of a further modified form.

Figure 1:
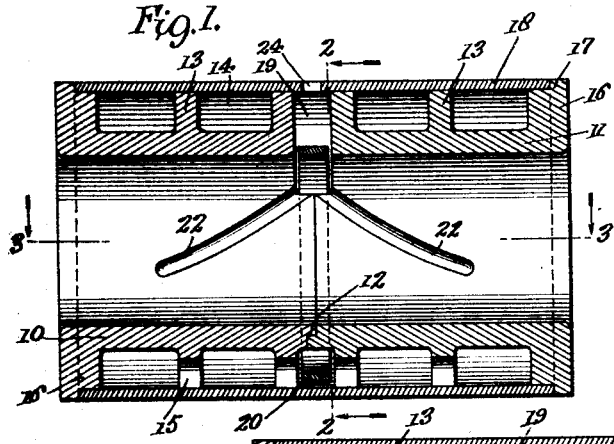

Referring to the drawings, and first to the form disclosed in Figures 1, 2 and 3, 10 and 11 designate a pair of bushing sections or collars adapted to be positioned on a shaft rotatable in the bushing sections. The bushings sections are interfitted at their inner adjacent ends by a stepped or rabbet joint 12 which not only maintains the bushing sections 10 and 11 in axial alignment with each other but also seals the joint between the sections. The bushing sections 10 and 11 are provided upon their outer surfaces with annular partitions 13 which are spaced apart lengthwise of the bushing sections to provide annular chambers 14 therebetween adapted to receive a lubricant. The partitions 13 at their lower portions, are provided with notches or recesses 15 forming passages for intercommunicating the annular compartments 14 with one another. The opposite outer ends of the sections 10 and 11 are provided with outstanding flanges 16, which provide end walls for the end chambers 14 and which are shouldered or rabbeted as at 17 for the reception of the opposite ends of a tubular shell 18 which surrounds the bushing sections 10 and 11 for closing the outer sides of the chambers 14. The opposite ends of the shell 18 set in the rabbets 17 and thus seal the shell about the bushing. The inner ends of the bushing sections 10 and 11 project slightly beyond the adjacent partitions 13 and are brought into abutting relation to provide an annular central space 19 forming a chamber or runway for a feeding ring 20. The upper sides of the bushing sections 10 and 11 are provided with recesses 21 which open entirely through the tops of the bushings 10 and 11 and which are located between the partitions 13 and communicate the ring space 19 with the inner side of the bushings 10 and 11. The bushings 10 and 11 are provided on the inner surfaces with diagonally and spirally extending slots 22 which lead downwardly in one side of the bushing from the recesses 21 so that oil entering the recesses 21 will be caught in the slots 22 and carried downwardly and lengthwise of the bushing sections 10 and 11 to spread or distribute the oil over a considerable surface area of a shaft mounted in the bushing.

Figure 2:
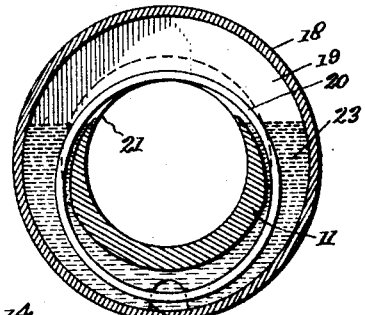
Figure 2 is a transverse section taken through the same on the line 2—2 of Figure 1.

The feeding ring 20 is of a diameter such that the inner face of the ring rests upon the upper side of a shaft and, as the shaft revolves, the ring 20 rolls with its inner side in surface contact with the shaft so as to roll the ring in its suspended position from the shaft. The lower part of the bearing is adapted to receive a body of lubricant 23 as shown in Figure 2. The ring 20 dips into this body of lubricant 23 and as the ring revolves it raises a film of the lubricant in surface contact with the inner and outer faces and opposite edges of the ring and by virtue of the contact of the ring 20 with the shaft the film of oil is transferred to the shaft and at the same time the excess oil from the shaft is inverted into the slots 22 and distributed lengthwise throughout the bushing sections 10 and 11.

The shell 18 may be provided at an intermediate point and in its upper side with an opening 24 through which lubricant may be introduced to the chambers 14 in the bushing, and through which air may freely pass to prevent suction incident to the consumption and outflow of oil from the bushing sections 10 and 11.

Figure 4:
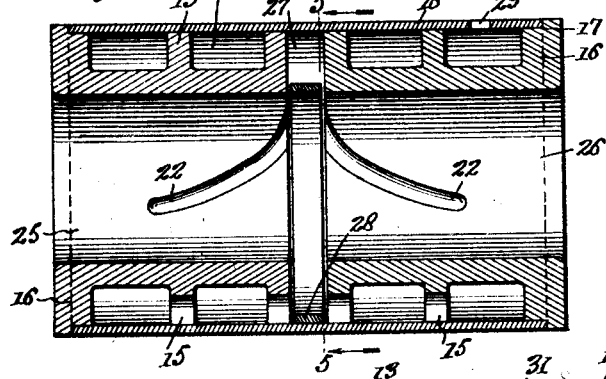
Figure 4 is a vertical section similar to Figure 1 but showing a slight modification in the structure.
Figure 5:
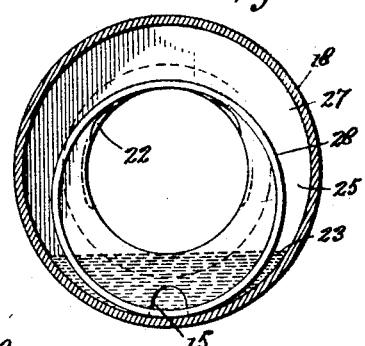
Figure 5 is a transverse section taken on the line 5—5 of Figure 4.

The form of the invention shown in Figures 4 and 5 discloses a pair of bushing sections 25 and 26 similar in construction to the sections 10 and 11 but with the rabbeted portions 12 removed so that the bushing sections 25 and 26 terminate substantially in the planes of their inner adjacent partitions 13. The end walls or flanges 16 of the bushing sections engage the opposite ends of the shell 18 and consequently maintain a ring chamber 27 between the inner ends of the bushing sections for accommodating a feeding ring 28. The ring 28 is of such diameter that when the ring bears at its inner surface upon the upper part of a shaft passing through the bushing sections 25 and 26, the exterior or outer surfaces of the ring 28 bears against the inner bottom portion of the shell 18. In this manner the ring 28 may be driven from two sources although the shell 18 drives the ring at a relatively great speed so that the upper part of the ring will have a sliding or slipping action over the top of the shaft with the result that the end film of oil which is lifted by the ring 28 will be removed and deflected backwardly through the space between the bushings 25 and 26 and into the slots 22. In this instance, the vent and filler opening 29 may be provided in the shell 18 near one end thereof.

Figure 6:
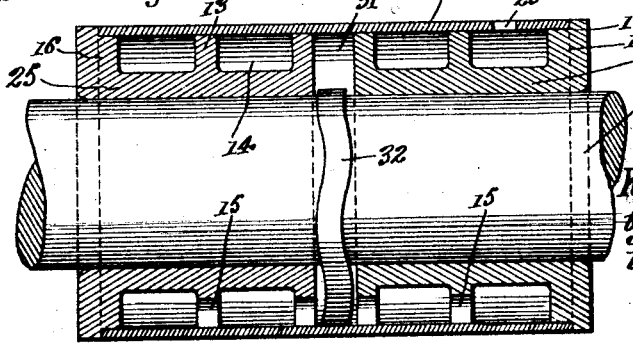
Figure 6 is a view similar to Figure 4 but showing a shaft and feed ring carried thereby, the ring being of modified construction.

In the modification shown in Figure 6 a shaft 30 is disclosed in position in the bushing sections 25 and 26 and a structure similar to that shown in Figures 4 and 5 with the exception that the ring chamber or space 31 may be slightly wider than the space 27 to accommodate a ring 32 which is of undulating or lateral offset formation as shown. This type of ring is adapted to present an increased surface area for the film of oil so that a larger amount of oil may be raised and distributed as compared with the plane ring of Figure 4. The structure is otherwise identical.

Figure 3:
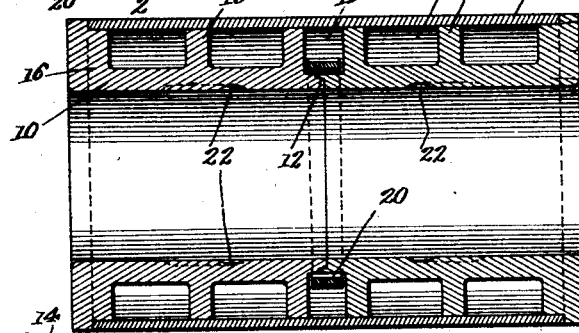
Figure 3 is a horizontal section taken on the line 3—3 of Figure 1.

The structures disclosed in Figures 4, 5 and 6 are more peculiarly adapted to that type of bearing wherein the bushing with its parts are located upon a relatively stationary shaft. The structure shown in Figures 1, 2 and 3 is of the type wherein the bushing is maintained stationary while the shaft turns in the bushing, and the downwardly diverging slots or grooves 22 are shown in Figure 3 as being duplicated in the opposite sides of the bushing.

The modified form shown in Figure 7 embodies sections 33 and 34 having spaced partitions 35 to provide oil chambers 36 in the outer sides of the bushing sections and which have extended and abutting portions 37 beyond the inner adjacent partitions 35 to maintain the same in spaced relation and providing a ring chamber 38 in which is placed a ring 39. The abutting portions 37 are cut away at the top of the bushing to provide a recess or opening thereat so that the ring 39 may engage directly upon a shaft when the bushing is mounted on the shaft. The shell 40 is seated upon the peripheral edges of the partitions 35 and has outwardly facing shoulders 41 at its inner side and near its opposite ends, the shoulders 41 being adapted to seat against the inner edges of the partitions 35 for maintaining the bushing sections in spaced relation and to hold the shell 40 in position for closing the oil chambers 36.

The form shown in Figure 8 is similar to that of Figure 7 with the exception that the bushing section 34 only has an abutting extension 42 which engages the end of the other section 33 to provide the ring space 38. In this instance, the shell 40 is provided with shoulders 43 arranged near the central portion of the shell and adapted to abut against the inner opposite surfaces of the partitions 35 at the ring space to maintain the space open and hold the shell from displacement.

In Figure 9 the bushing 44 is in one piece throughout its length with a recess 45 cut in its top between the spaced metal partitions 35 to accommodate the ring 46. In this instance, the ring 46 is made with a cross-cut and welded after being positioned in the ring space 38. The shell 47 is held in place on the partitions 35 by swaging or turning down the opposite ends of the shell to provide flanges 48 lapping against the outer surface of the outermost partitions 35 to hold the shell 47 from longitudinal displacement on the bushing.

In Figure 10 the shell 49 is shrunk upon the peripheral edges of the partitions 35 of the integral bushing 44, and in other respects the structure is similar to that shown in Figure 9.

Figure 11 shows the bushing comprising a pair of sections 50 and 51 with an abutting portion 52 carried by the section 51 to space the sections apart and provide a ring groove or space 53. A shell 54 is arranged concentrically about the bushing and carries the partitions 55 which extend inwardly and provide therebetween the oil chambers 56. The inner edges of the partitions 55 bear against the bushing sections 50 and 51 to close the oil chambers 56, the inner partitions 57 may be of increased depth to seat a shouldered recess 58 formed in the inner adjacent ends of the bushing sections 50 and 51 to hold the shell 54 and the bushing from longitudinal relative movements.

Figure 12 shows a modification of Figure 11 wherein the partitions 55 are of unequal depth but wherein the bushing sections 58 and 59 have outturned flanges 60 at their outer ends for engagement with the outer sides of the end partitions 55 to hold the shell and the bushing from shifting longitudinally of each other.

The form of invention shown in Figure 13 embodies a combined structure wherein the bushing section 61 has outstanding partitions 62 thereon forming an oil chamber 63. The bushing sections 67 has smooth peripheral surfaces and an extension 68 at its inner end recessed at 69 and adapted to abut against the section 61 to provide a ring space 70 in which is fitted a ring 71 the shell 72 has a smooth inner surface 73 adapted to abut the partitions 66 while the outer end of the shell 72 has partitions 74 which extend inwardly and abut the smooth surface of the bushing section 67. The partitions 74 provide an oil chamber 75 in the shell 72.

The types of bearings shown in Figures 7 to 13 inclusive are particularly adapted to stationary bushings, and the modification shown in Figure 14 is more particularly adapted to a rotating bushing wherein the bushing 76 is in one piece recessed at its top and intermediate its ends as at 77 to accommodate a split welded ring 78 for contact with a shaft, the shell 79 carrying a series of consecutively shortened partitions 80 and 81 adapted to engage the peripheral surface of the bushing 86 at opposite sides of the ring 78. The outermost short partition 81 is rabbeted or shouldered as at 82 to interlock with an outstanding bead 83 carried upon the adjacent end of the bushing 76 for holding the bushing and shell in proper relation and admitting of the introduction of the bushing into the shell from one end.

In Figure 15 a bushing 84 surrounds the shaft 85 and has annular flanges 86 providing oil channels therebetween. The flanges 86 engage the shell or outer part 87 having an oil inlet 88 and one of the outer flanges 86 may have a clean out plug 89 through which sediment may be removed. The inner flanges are spaced apart to accommodate an oil ring 90 and are notched at their lower edges to intercommunicate the oil channels.

In Figure 16 the bushing 91 has a smooth exterior surface with the ring slot as in its upper side as in Figure 15 and through which operates a chain or ring 92. The shell 93 has inwardly projecting spaced flanges 94 seating against the bushing 91 and providing oil channels thereabout.

It is apparent that the shells of all of the forms of the invention may be in the form of hubs, frames, or other like stationary portions of machines or the like wherein the bushings may be seated, and Figure 13 shows the shell 72 broken away and is suggestive of the indeterminate thickness in the part referred to as the shell.

In all forms of the invention the bushings may be made of bronze, cast iron or the like, with a cored hole therethrough for the shaft, the outside grooves or oil chambers may be cast either in the bushing or in the shell as may also be the ring space or chamber. The shell and the oil ring may be made from tubing in most forms of the invention so that the cost of manufacture and use of the bearing is reduced to a minimum and is but slightly higher than the cost of a plain bushing. As the exterior or outer side of the bushing is concentric with the bore the improved bushing may be applied as easily as is the application of the ordinary plain bushing.

It will be obvious that many changes in the construction, combination and arrangement of parts could be made, which could be used without departing from the spirit of my invention, and I do not mean to limit the invention to such details, except as particularly pointed out in the claims.

Having thus described my invention, what I claim and desire to secure by Letters Patent of the United States is:—

1. A self-lubricating bearing comprising a pair of bushing sections having spaced annular partitions on their outer surface providing oil spaces between the partitions, a shell fitting over the partitions to close the oil spaces, said bushing sections having abutting portions at their inner ends for spacing the inner partitions apart and providing a ring space therebetween, said sections of the bushing being cut away at the top and at the ring space to open the top of the ring space to the interior of the bushing, a pair of downwardly diverging grooves formed in the inner walls of the bushing sections and leading from said ring space, and a ring mounted in the ring space for contact with a shaft mounted in the bushing for turning the ring and elevating oil from the bottom of the bearing.

2. A self-lubricating bearing comprising a pair of abutting bushing sections provided with annular partitions spaced apart to provide an intermediate ring space and opposite end oil chambers, a shell seated upon the partitions and closing said ring space and oil chambers, said bushing sections being cut away at their meeting ends and at their upper sides to intercommunicate the ring space with the interior of the bushing, oil grooves formed in the inner face of the bushing sections and leading from said ring space, and a ring mounted in the ring space for contact with the upper side of a shaft mounted in said bushing to raise oil to the shaft and for distribution into said oil grooves.

3. In a self-lubricating bearing, the combination with a shaft of a bushing mounted on said shaft and composed of two parts, provided with diverging grooves in the interior thereof, a shell surrounding the bushing, partitions carried by the bushing and located between the bushing and the shell, means for holding the shell and bushing against relative longitudinal movement, the two parts of said bushing having a ring space intermediate between their ends, said space communicating with the diverging grooves in the interior of the bushing, said bushing having oil chambers between the partitions, said partitions having openings therethrough connecting the oil chambers and ring space, and a ring loosely mounted in said ring space and normally resting on the shaft for elevating oil from the bottom of the bearing to said shaft.

KARIN O. NILSSON.